(Model.)
W. S. SANDERSON.
EGG TESTER.
No. 250,105. Patented Nov. 29, 1881.
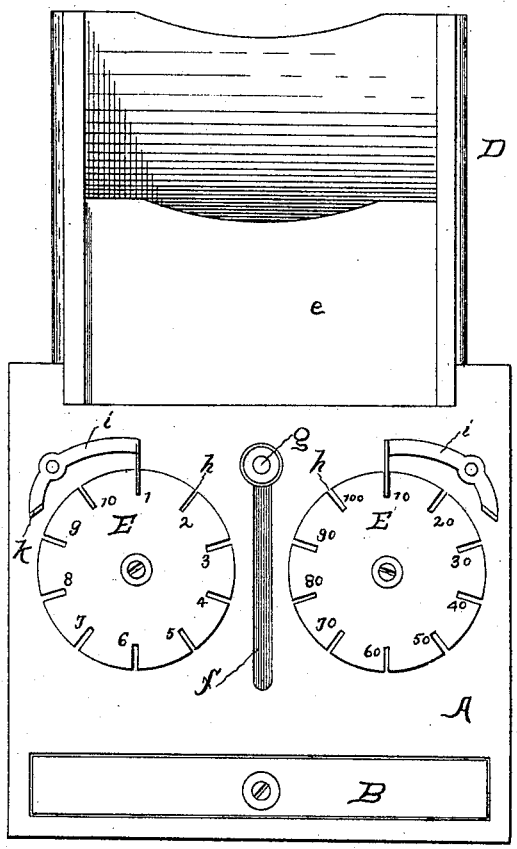
Fig. 1.
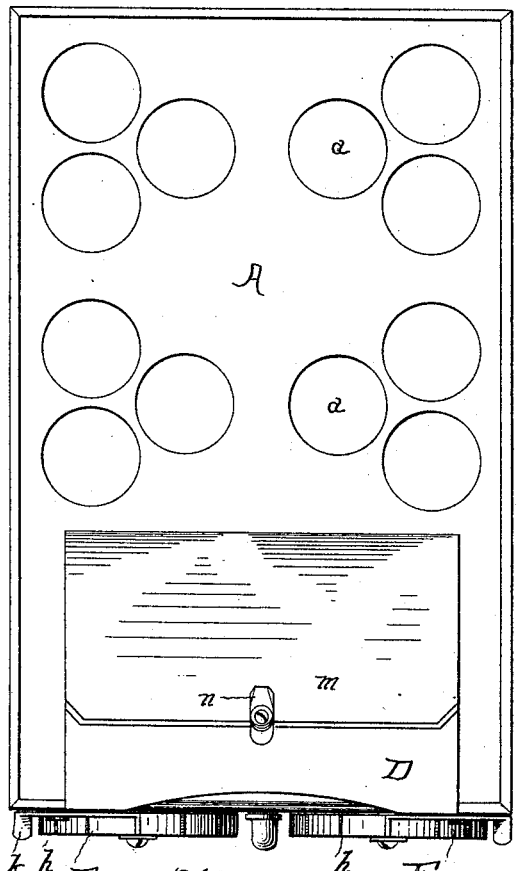
Fig. 2.
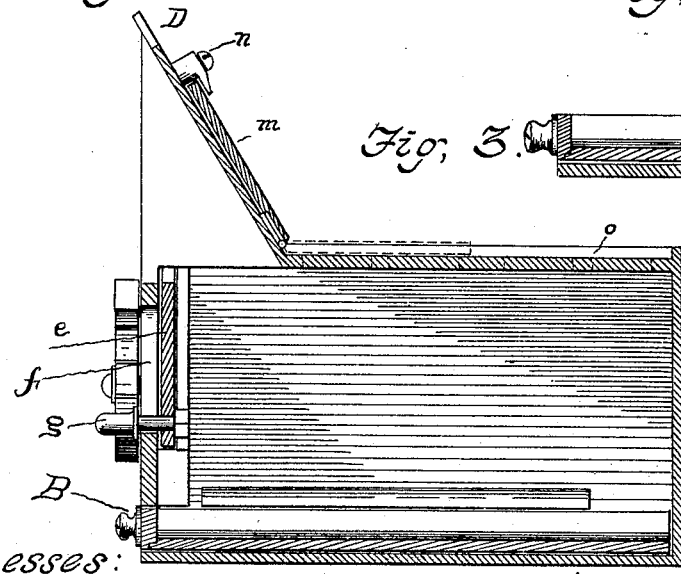
Fig. 3.
Fig. 4.
Witnesses:
J. West Wagner.
Frank L. Middleton
Inventor:
William S. Sanderson
by Ellis Spear
Attorney

UNITED STATES PATENT OFFICE.

WILLIAM S. SANDERSON, OF IONIA, MICHIGAN, ASSIGNOR TO HIMSELF, BRITTON L. UDELL, MOSES H. AMPHLETT, AND JAMES A. SAGE, ALL OF SAME PLACE.

EGG-TESTER.

SPECIFICATION forming part of Letters Patent No. 250,105, dated November 29, 1881.

Application filed August 30, 1881. (Model.)

*To all whom it may concern:*

Be it known that I, WILLIAM S. SANDERSON, of Ionia, in the county of Ionia and State of Michigan, have invented a new and useful Improvement in Egg-Testers; and I do hereby declare that the following is a full, clear, and exact description of the same.

My invention is an apparatus for testing eggs, in order to distinguish the fresh from the stale. The apparatus is desirable for domestic purposes, but more especially important for dealers in that article. I have aimed especially to produce an apparatus by which a number of eggs at a time can be examined and their condition readily and certainly ascertained. The apparatus is based upon the fact that the fresh eggs are translucent, but when from any cause they become stale or bad they become practically opaque, and the apparatus is adapted to receive the eggs in the perforations of a plate and hold them while the transmitted light is inspected upon a mirror or suitable surface below the plate which sustains the eggs. I have also combined with the apparatus a register, conveniently operated in connection therewith, by means of which the eggs may be counted, and a record kept of their number as they are examined and laid aside.

In the accompanying drawings, Figure 1 shows a front elevation, Fig. 2 a plan view, and Fig. 3 a central longitudinal section, of the apparatus; Fig. 4, a detail view, slightly reduced, showing the spring.

In these drawings, A represents a box or chamber, made of any material suited to the purpose, such as wood, metal, or pasteboard. Its size may be varied greatly without departing from the spirit of my invention. I prefer, however, to make it about a foot in length and ten inches in width and depth, that size affording space for the testing of a dozen eggs at a time.

The top of the box is perforated, as shown in Fig. 2, each perforation being adapted in size to receive an egg and sustain it without letting it fall through. The holes are preferably arranged, as shown, in threes, those of each set being as near as convenient to each other. This permits the more ready handling of the eggs, as three can be grasped by the fingers of one hand at a time.

The holes may be cut through the metal or wood, which should be as thin as convenient, and they are made of a size which will sustain small sizes of eggs. These holes are indicated at $a$.

In the bottom of the box I arrange a slide, B, which can be drawn out from the front, but when in place closes the front. A mirror of ordinary quicksilvered or painted glass, or of bright metal, or any suitable reflecting-surface, is placed upon the slide, preferably so as to cover its entire surface. A knob on the front of the slide is provided for convenience in pulling out or sliding in. A steel spring, $c$, of flat metal, is placed on the bottom of the box, so that the slide, as it moves in or out in its guides, compresses the spring, which holds it steadily in place. Manifestly a catch may be used instead of this, although this is more convenient.

On the top and front of the box is an inclined hood, D, open toward the front, but permanently closed on the sides and inclined rear. The front may be partially closed or the opening graduated in size by means of a sliding door, $e$. This moves in guides just within the front end of the box, and is held in place by a thumb-screw, which passes through a vertical slot, $f$.

The thumb-screw (shown at $g$) serves as a handle to raise and lower the door, and has a stop to hold it in place at any required point. Both the top of the slide and the inclined back of the hood are preferably cut away on a curve at the center, for the convenience of the user in inspecting the interior, the incline conforming to the form of the head. By means of this hood, with its adjustable opening in front, the user can inspect the mirrored bottom without having the light thrown upon the bottom to any material extent, except through the openings in the top.

It will be apparent, therefore, that the eggs being placed in the holes, practically no light will be admitted to the interior of the box, except that which passes through the eggs, and from the appearance upon the mirror the user can determine accurately the condition of the eggs. The eggs, also, are in position, in respect to the user, so that he can readily place his hand on any one which may appear to be bad, and readily remove it.

In case it be found desirable to place only a half-dozen eggs at a time in the perforated top, I provide a cover, m, and hinge it at the bottom of the incline of the hood, so that it will cover exactly six holes, leaving the other six uncovered. This prevents the light from shining through the unoccupied holes and destroying the effect of the apparatus. A button, n, in suitable place, holds the cover in place against the inclined back of the hood when not in use.

In front of the box I have placed disks E E', one on each side of the vertical slot. These are pivoted upon the end of the box, so as to turn freely thereon, and are provided with notches h, into which a locking-pawl, i, drops, thereby locking the disk in place at any given point. The left-hand disk, E, is shown with numbers from one to ten, in order, upon the side and periphery, the notches being ten in number.

The right-hand disk, E', is in construction exactly like the disk E, but the numbers placed opposite the notches are different, the first notch being numbered 10, the second 20, and so on consecutively up to 100. In this way the left-hand disk is made to keep the record of units and the right-hand disk the record of tens. The pawls are pivoted to move freely upon the end of the box, and the rear end of the pawl is provided with an outwardly-turned end, k, which, when depressed, rests upon the periphery of the disk. When it so rests upon the disk, the locking end of the pawl is removed from the notch, and the disk may turn. This construction enables the operator to depress the pawl by putting his finger upon the projection k, thereby unlocking the pawl, and when the projection k comes down upon the periphery of the disk his finger is in position to move the disk by slipping it slightly aside from the projection k to the periphery of the disk. He may then turn the disk, leaving the pawl free to drop into the next notch, which registers one or more dozen, or any unit determined upon. In the same way the other disk records tens.

The numbers upon the disks may be varied according to the convenience of the user. By placing the figures both upon the face and periphery they can be more readily seen by the operator. The disks and pawl are in such position that the user may turn the disks readily without moving from the position occupied by him while inspecting the eggs.

I wish it to be understood that I do not limit myself to the precise form of the box, nor to the precise form of the registering apparatus, and, manifestly, the box can be used without any registering apparatus.

Around the edge of the box, on top, I form a rim, o, (shown clearly in Fig. 3,) in order to prevent any eggs that may slip from the hands of the operator from falling to the ground.

It will be obvious that the construction of the cover may be varied so as to cover any number of apertures desired. It may be made folding or in any other suitable manner.

Having thus described my invention, what I claim is—

1. The described egg-testing device, consisting of a box or case, A, having a mirror mounted in a removable slide in the bottom of the box, a perforated top to hold the eggs, a hood or opening for the inspector, an adjustable sliding door to partially or wholly close the hood, and a hinged door, m, to shut off the light from a portion of the openings in the top, all as described.

2. In combination with a device for testing eggs by light, having an inspection opening or hood, the counting-disks, provided with gravity-catches arranged upon the front of the box, and adapted to be operated when not in sight by the hands of the person who is inspecting the eggs.

In testimony whereof I have signed my name to this specification in the presence of two subscribing witnesses.

WILLIAM S. SANDERSON.

Witnesses:
JOHN W. BALDIE,
F. A. STIVEN.